US010287213B2

(12) United States Patent
Perez et al.

(10) Patent No.: US 10,287,213 B2
(45) Date of Patent: May 14, 2019

(54) FRANGIBLE PROJECTILE AND METHOD FOR MAKING SAME

(75) Inventors: Martin Gerardo Perez, Towanda, PA (US); Eric Timothy Riley, Nichols, NY (US); Erika Vanessa Esquivel, Towanda, PA (US)

(73) Assignee: Global Tungsten and Powders Corp., Towanda, PA (US)

( * ) Notice: Subject to any disclaimer, the term of this patent is extended or adjusted under 35 U.S.C. 154(b) by 338 days.

(21) Appl. No.: 13/466,838

(22) Filed: May 8, 2012

(65) Prior Publication Data
US 2012/0308426 A1 Dec. 6, 2012

Related U.S. Application Data

(60) Provisional application No. 61/483,713, filed on May 8, 2011.

(51) Int. Cl.
| B22F 3/26 | (2006.01) |
| C04B 35/52 | (2006.01) |
| C04B 35/10 | (2006.01) |
| C04B 35/56 | (2006.01) |
| C04B 35/626 | (2006.01) |
| C04B 35/634 | (2006.01) |
| F42B 8/14 | (2006.01) |
| F42B 12/72 | (2006.01) |

(52) U.S. Cl.
CPC ........... *C04B 35/522* (2013.01); *B22F 3/26* (2013.01); *C04B 35/10* (2013.01); *C04B 35/56* (2013.01); *C04B 35/6269* (2013.01); *C04B 35/634* (2013.01); *F42B 8/14* (2013.01); *F42B 12/72* (2013.01); *B22F 2998/10* (2013.01); *C04B 2235/608* (2013.01); *C04B 2235/616* (2013.01)

(58) Field of Classification Search
CPC ........................................................ B22F 3/26
USPC ............................................................. 419/66
See application file for complete search history.

(56) References Cited

U.S. PATENT DOCUMENTS

| 3,123,003 | A |   | 3/1964  | Lange |         |
|-----------|---|---|---------|-------|---------|
| 5,237,930 | A | * | 8/1993  | Belanger et al. | 102/529 |
| 5,767,438 | A |   | 6/1998  | Lang  |         |
| 5,910,345 | A |   | 6/1999  | Luban |         |
| 5,917,143 | A | * | 6/1999  | Stone | 102/506 |
| 5,976,215 | A |   | 11/1999 | Uenosono |      |
| 6,090,756 | A | * | 7/2000  | Brown | C10M 111/04 102/511 |

(Continued)

FOREIGN PATENT DOCUMENTS

| GB | 1175274        | 12/1969 |
| WO | WO-2001/098006 A2 | 12/2001 |

(Continued)

OTHER PUBLICATIONS

E. Paul DeGarmo, et al, "Materials and Processes in Manufacturing" Eigth Edition, 1007, p. 427.*

(Continued)

*Primary Examiner* — Christopher S Kessler
(74) *Attorney, Agent, or Firm* — Ballard Spahr LLP

(57) ABSTRACT

In one aspect, the invention relates to compositions useful in frangible projectiles, methods of making same, and articles comprising same This abstract is intended as a scanning tool for purposes of searching in the particular art and is not intended to be limiting of the present invention.

26 Claims, 13 Drawing Sheets

(56) References Cited

U.S. PATENT DOCUMENTS

| | | | |
|---|---|---|---|
| 2002/0005137 A1* | 1/2002 | Stone | 102/517 |
| 2003/0143099 A1* | 7/2003 | Amick | 419/65 |
| 2004/0129165 A1 | 7/2004 | Cesaroni | |
| 2004/0216589 A1* | 11/2004 | Amick | A01K 95/005 86/54 |
| 2005/0016411 A1* | 1/2005 | Amick | F42B 30/02 102/501 |
| 2005/0036899 A1* | 2/2005 | Lindenau et al. | 419/38 |
| 2008/0000379 A1* | 1/2008 | Hansen | 102/517 |
| 2009/0283720 A1 | 11/2009 | Sweeney et al. | |
| 2010/0015432 A1 | 1/2010 | Bergmark et al. | |
| 2012/0308426 A1 | 12/2012 | Perez | |

FOREIGN PATENT DOCUMENTS

| | | |
|---|---|---|
| WO | WO-2002/068898 A1 | 9/2002 |
| WO | WO-2003/033753 A2 | 4/2003 |
| WO | WO 2013/022506 | 2/2013 |

OTHER PUBLICATIONS

"ARC-42 (FC-0208) Remill Material Safety Data Sheet" from Arc Metals last updated Dec. 28, 2007.

"ARC-42 (FC-0208) Remill Data Sheet" from Arc Metals last updated Nov. 2012.

International Search Report and Written Opinion issued by the International Bureau dated Jan. 31, 2013 for PCT/US2012/036974, filed on May 8, 2012 and published as WO 2013/022506 on Feb. 14, 2013 (Applicant—Global Tungsten & Powders Corp. // Inventors—Perez et al.) (21 pages).

Office Action dated May 30, 2018 by the Canadian Intellectual Property Office for Patent Application No. 2,834,775, which was filed on Dec. 6, 2013 (Inventor—Perez et al.; Applicant—Global Tungsten and Powders Co.) (3 pages).

Supplementary European Search Report and Written Opinion dated Jul. 20, 2015 by the European Patent Office for European Patent Application No. 12822344.3, which was filed on Nov. 11, 2013 and published as 2707218 on Mar. 19, 2014 (Inventor—Perez et al.; Applicant—Global Tungsten and Powders Co.) (13 pages).

Second Office Action dated Apr. 16, 2018 by the Intellectual Property Office of Mexico for Patent Application No. MX/a/2013/012928, which was filed on May 8, 2012 (Inventor—Perez et al.; Applicant—Global Tungsten & Powders Corp.) (Translation only—5 pages).

Communication Pursuant to Article 94(3) EPC dated Jan. 30, 2017 by the European Patent Office for European Patent Application No. 12822344.3, which was filed on Nov. 11, 2013 and published as 2707218 on Mar. 19, 2014 (Inventor—Perez et al.; Applicant—Global Tungsten and Powders Co.) (7 pages).

Office Action dated Jun. 27, 2017 by the Intellectual Property Office of Mexico for Patent Application No. MX/a/2013/012928, which was filed on May 8, 2012 (Inventor—Perez et al.; Applicant—Global Tungsten & Powders Corp.) (Translation only—5 pages).

International Preliminary Report on Patentability dated Nov. 12, 2013 by the International Searching Authority for Patent Application No. PCT/US2012/036974, which was filed on May 8, 2012 and published as WO 2013/022506 on Feb. 14, 2013 (Inventor—Perez et al.; Applicant—Global Tungsten and Powders Co.) (19 pages).

Third Office Action dated Oct. 22, 2018 by the Intellectual Property Office of Mexico for Patent Application No. MX/a/2013/012928, which was filed on May 8, 2012 (Inventor—Perez et al.; Applicant—Global Tungsten & Powders Corp.) (Translation only—4 pages).

* cited by examiner

FRANGIBLE PROJECTILE AND METHOD FOR MAKING SAME

CROSS-REFERENCE TO RELATED APPLICATIONS

This application claims the benefit of U.S. Application No. 61/483,713 filed May 8, 2011, which is hereby incorporated herein by reference in entirety.

BACKGROUND

Frangible, or breakable, materials are designed to disintegrate into fragments or dust upon impact with an object or surface having a hardness greater than the frangible material. In this context, frangible projectiles have been produced to exhibit analogous behavior upon impacting a target. As a result, frangible projectiles have reduced risk of harm to unintended targets from ricochets or over-penetration, which can occur with solid projectiles. Moreover, the properties of frangible projectiles make them ideal candidates for use as ammunition in close proximity combat or target environments.

Conventional frangible projectiles are prepared using metal powders, such as, for example, Cu-10% Sn powders, which are sintered under high temperature. Preparation techniques for such conventional frangible projections include sintering under high temperatures, requiring extensive processing equipment and energy. In addition, the properties of the resulting frangible projectiles are inextricably tied to the metals and sintering conditions used in their preparation.

Therefore, there remains a need for improved frangible projectiles and methods for the manufacture thereof, which can provide economical and effective frangible projectiles. This need and other needs are satisfied by the present invention.

SUMMARY

In accordance with the purpose(s) of the invention, as embodied and broadly described herein, the invention, in one aspect, relates to compositions useful in frangible projectiles, methods of making same, and articles comprising same.

Disclosed are compositions comprising: (a) from about 50% wt. to about 98% wt. of a powder metal component; and (b) from about 2.0% wt. to about 10.0% wt. of a polymer component Also disclosed are methods of preparing frangible compositions comprising: (a) providing a substantially homogenous powder metal composition, (b) compacting/pressing the powder metal composition to produce a molded green compact; (c) impregnating the green compact with a polymer; and (d) curing the green compact.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification. Additional advantages will be set forth in part in the description which follows, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects and together with the description serve to explain the principles of the invention.

Figure 1:
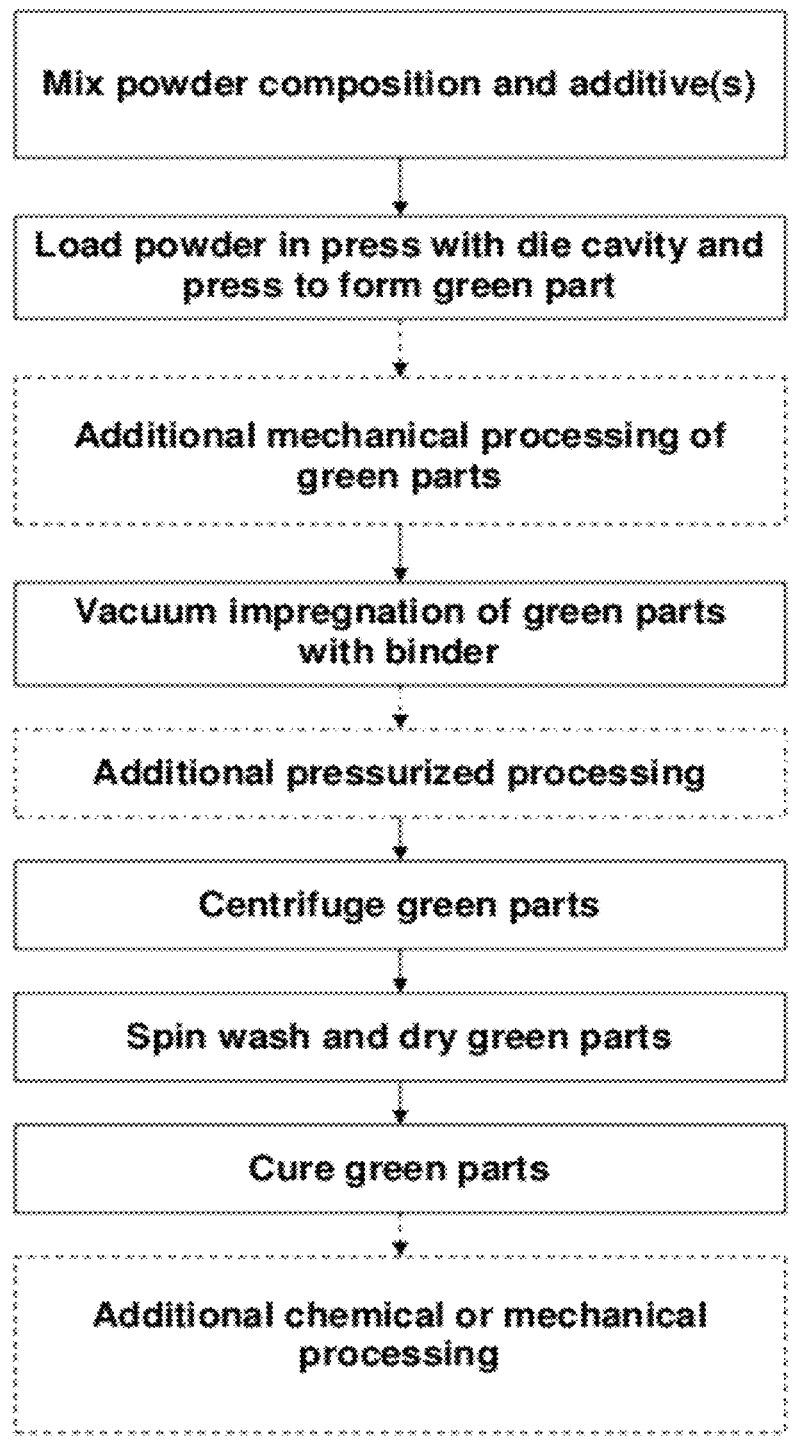
FIG. 1 shows a schematic illustrating methods in accordance with the present invention.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Definitions

As used in the specification and the appended claims, the singular forms "a," "an" and "the" include plural referents unless the context clearly dictates otherwise. Thus, for example, reference to "a component" includes mixtures of two or more components.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

A weight percent (wt. %) of a component, unless specifically stated to the contrary, is based on the total weight of the formulation or composition in which the component is included.

As used herein, the terms "green compact" or "green part" means a pressed metal powder part made in accordance with the present invention, and can be used interchangeably.

As used herein, the terms "optional" or "optionally" means that the subsequently described event or circumstance can or can not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (I.e. one or more hydrogen atoms is replaced) or unsubstituted. Typically, an alkyl group is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "carboxylic acid" as used herein is represented by the formula —C(O)OH.

The term "ester" as used herein is represented by the formula —OC(O)$A^1$ or —C(O)O$A^1$, where $A^1$ can be alkyl, cycloalkyl, alkenyl, cycloalkenyl, alkynyl, cycloalkynyl, aryl, or heteroaryl group as described herein. The term "polyester" as used herein is represented by the formula -($A^1$O(O)C-$A^2$-C(O)O)$_a$— or -($A^1$O(O)C-$A^2$-OC(O))$_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula $A^1$O$A^2$, where $A^1$ and $A^2$ can be, independently, an alkyl, cycloalkyl, alkenyl, cycloalkenyl, alkynyl, cycloalkynyl, aryl, or heteroaryl group described herein. The term "polyether" as used herein is represented by the formula -($A^1$O-$A^2$O)$_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "hydroxyl" or "hydroxyl," as used herein can be used interchangeably and refers to a group represented by the formula —OH.

The term "aldehyde" as used herein is represented by the formula —C(O)H.

The term "ketone" as used herein is represented by the formula $A^1$C(O)$A^2$, where $A^1$ and $A^2$ can be, independently, an alkyl, cycloalkyl, alkenyl, cycloalkenyl, alkynyl, cycloalkynyl, aryl, or heteroaryl group as described herein.

The term "nitro" as used herein is represented by the formula —NO$_2$.

The term "nitrile" or "cyano," as used herein can be used interchangeably and refers to a group represented by the formula —CN.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Compositions

As briefly described above, the present invention relates to frangible compositions. In one aspect, the frangible composition is useful in frangible projectiles, such as, for example, a 9 mm frangible projectile.

In various aspects, disclosed are frangible projectile compositions comprising: from about 50% wt. to about 98% wt. of a powder metal component; and from about 2.0% wt. to about 10.0% wt. of a polymer component. In a further aspect, the composition comprises from about 0% wt. to about 5% wt. of at least one additive. In a yet further aspect, the at least one additive comprises a binder, a lubricant, a filler, or combination thereof. In a still further aspect, the additive can comprise an additive suitable for use in a frangible projectile. In an even further aspect, the additive comprises acrawax.

In various aspects, frangible compositions of the present invention having sufficient handling strength can be pressed from, for example, an inexpensive iron powder, to net dimensions. In a further aspect, the powder metal component is any powder material capable of densification into a green compact with sufficient porosity to accommodate a thermoplastic polymer. In a yet further aspect, the powder metal component is selected from ferrous powder, non-ferrous powder, refractory powder, magnetic powder, carbide powder, ceramic powder, noble metal powder, intermetallic powder, nano powder, mechanically-alloyed powder, graphite powder, alumina powder, metal-coated powder or combination including at least one of the foregoing powders.

In a further aspect, the powder metal component can be selected from iron, copper, tin, nickel, bronze, cobalt, aluminum, beryllium, titanium, magnesium, zinc, chromium, tungsten, bismuth, tantalum, molybdenum, niobium, rhenium, hafnium, vanadium, or combinations including at least one of the foregoing powder metals. In a yet further aspect, the powder metal component is selected from iron, copper, tin, zinc, or a combination including at least one of the foregoing powders. In a still further aspect, the powder metal component comprises iron, tin, and zinc. In an even further aspect, the powder metal component comprises iron and copper. In a yet further aspect, the powder metal component comprises copper-plated iron. In a still further aspect, the powder metal component comprises iron, such as, for example, Arc-42 powder.

In a further aspect, the polymer component comprises a thermoplastic polymer. In a yet further aspect, the polymer component comprises a thermoplastic or thermosetting polymer resin. In a still further aspect, the polymer component is an organic polymer. In an even further aspect, the polymer component is selected from a thermoplastic resins or blends of thermoplastic resins. In a yet further aspect, the polymer component comprises a one or more thermoplastic resins with one or more thermosetting resins. In a still further aspect, the polymer component is a blend of polymers, copolymers, terpolymers, or combinations including at least one of the foregoing polymers.

In a further aspect, the thermoplastic polymer can comprise polyethylene (PE), including high-density polyethylene (HDPE), linear low-density polyethylene (LLDPE), low-density polyethylene (LDPE), mid-density polyethylene (MDPE), glycidyl methacrylate modified polyethylene, maleic anhydride functionalized polyethylene, maleic anhydride functionalized elastomeric ethylene copolymers, ethylene-butene copolymers, ethylene-octene copolymers, ethylene-acrylate copolymers, such as ethylene-methyl acrylate, ethylene-ethyl acrylate, and ethylene butyl acrylate copolymers, glycidyl methacrylate functionalized ethylene-acrylate terpolymers, anhydride functionalized ethylene-acrylate polymers, anhydride functionalized ethylene-octene and anhydride functionalized ethylene-butene copolymers, polypropylene (PP), maleic anhydride functionalized polypropylene, glycidyl methacrylate modified polypropylene, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polyoxymethylenes, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyurethanes, or a combination including at least one of the foregoing organic polymers.

In a further aspect, the polymer component comprises polyacrylate, polymethacrylate, polyvinyl alcohol, polyurethane, polyolefin, polyester, acrylic polyamide polymer, or a combination including at least one of the foregoing polymers. In a yet further aspect, the polymer component comprises acrylonitrile-butadiene-styrene/nylon, polycarbonate/acrylonitrile-butadiene-styrene, polyphenylene ether/polystyrene, acrylate/polyamide, polyphenylene ether/polyamide, polycarbonate/polyester, polyphenylene ether/polyolefin, or combinations including at least one of the foregoing blends of thermoplastic resins.

In a further aspect, the polymer component comprises an acrylate polymer. In a yet further aspect, the acrylate polymer comprises salts of acrylic acid, esters of acrylic acid, salts of methacrylic acid, esters of methacrylic acid, acrylonitrile, methacrylate, methyl acrylate, methyl methacrylate, ethyl acrylate, 2-chloroethyl vinyl ether, 2-ethylhexyl acrylate, hydroxyethyl methacrylate, butyl acrylate, butyl methacrylate, trimethylolpropane triacrylate, or a combination including at least one of the foregoing acrylates. In a still further aspect, the polymer component comprises methacrylate.

In a further aspect, the powder metal component is pressed for a sufficient time and sufficient pressure to form a green compact. In a yet further aspect, the powder metal component is pressed into a shaped green compact with a sufficient porosity to accommodate a thermoplastic polymer.

In a further aspect, the frangible projectile composition is formed using a pressing apparatus. In a yet further aspect, the frangible projectile composition is pressed using an uniaxial press with one or more die cavities. In a still further aspect, the pressing apparatus is an uniaxial high speed press.

In a further aspect, the frangible projectile composition is not pressed to a full theoretical density or a near full theoretical density, like done in iron or steel parts. In a still further aspect, the frangible projectile composition exhibits sufficient green strength for handling after pressing. In a yet further aspect, the density of the powder metal component is from about 5.0 g/cm$^3$ to about 7.5 g/cm$^3$ after pressing. In an even further aspect, the density of the powder metal component is from about 6.0 g/cm$^3$ to about 6.5 g/cm$^3$ after pressing, such as, for example, 6.4 g/cm$^3$.

In a further aspect, the frangible projectile composition exhibits porosity capable of accommodating the polymer component. In a yet further aspect, the frangible projectile composition exhibits porosity capable of accommodating from about 1 grain to about 10 grains of a polymer. In a still further aspect, the frangible projectile composition exhibits porosity capable of accommodating from about 2 grains to about 4 grains of a polymer.

In a further aspect, the polymer component is present in an amount from about 1% to about 10% of the final part weight. In a yet further aspect, the polymer component is present in an amount from about 2% to about 4% of the final part weight. Without wishing to be bound by a particular theory, it believed that the projectile of the present invention will not survive launch with less than 2% polymer content.

In a further aspect, the polymer component is incorporated into the frangible projectile composition by impregnation. In a yet further aspect, the polymer component is incorporated into the frangible projectile composition by impregnation under vacuum pressure. In a still further aspect, the polymer component is incorporated into the frangible projectile composition through pores in the shaped green compact. In an even further aspect, the polymer component substantially fills all pores in the frangible projectile composition. In a yet further aspect, the polymer component partially fills the pores in the frangible projectile composition. In a still further aspect, incorporation of the polymer component does not substantially affect the exterior dimension of the frangible projectile composition.

In a further aspect, the polymer component is cured after incorporation into the frangible projectile component. In a yet further aspect, the polymer component is cured by heating. In a still further aspect, the polymer component is cured in an anaerobic environment. In an even further aspect, the polymer component is cured in a water bath. Thus, in a further aspect, the frangible compositions of the present invention need a reduced level of debinding and/or sintering. In a yet further aspect, the frangible compositions of the present invention completely eliminate the need for debinding and/or sintering.

In a further aspect, the frangible projectile composition is shaped prior to introduction of the polymer. In a yet further aspect, the frangible projectile composition is machined after introduction of the polymer. In a still further aspect, the frangible projectile composition exhibits sufficient green strength for machining. In an even further aspect, the frangible projectile composition exhibits sufficient green strength for machining after curing.

In a further aspect, the frangible projectile composition comprises a substantially spherical shape. In a yet further aspect, the frangible projectile composition comprises a substantially conical shape.

In a further aspect, the frangible projectile composition when subjected to a crush test exhibits a vertical strength from about 500 to about 800 lbs. In a yet further aspect, the frangible projectile composition exhibits a vertical strength from about 650 to about 750 lbs. In a still further aspect, the frangible projectile composition exhibits a vertical strength from about 500 to about 800 lbs after curing. In an even further aspect, the frangible projectile composition exhibits a vertical strength from about 650 to about 750 lbs after curing.

In a further aspect, the frangible projectile composition exhibits a transverse strength from about 200 to about 500 lbs. In a yet further aspect, the frangible projectile composition exhibits a transverse strength from about 300 to about 400 lbs. In a still further aspect, the frangible projectile composition exhibits a transverse strength from about 200 to about 500 lbs after curing. In an even further aspect, the frangible projectile composition exhibits a transverse strength from about 300 to about 400 lbs after curing.

In various aspects, the frangible projectile composition further comprises at least one outer coating layer. In a further aspect, the at least one outer coating layer is applied to the frangible projectile composition in a post-processing step. In a yet further aspect, the at least one outer coating layer comprises a friction resistant or lubricating material.

In a further aspect, the at least one outer coating layer comprises an electroplated or other plated layer. In a yet further aspect, the at least one outer coating layer comprises a metal selected from copper, zinc, iron, steel, antimony, nickel, tungsten, or a combination thereof. In a still further aspect, the at least one outer coating layer comprises copper or zinc. In an even further aspect, the plated layer has a thickness from about 0.001" to about 0.01". In a still further aspect, the plated layer has a thickness from about 0.002" thick to about 0.006".

In a further aspect, the at least one outer coating layer comprises a paint coating layer. In a yet further aspect, the at least one outer coating layer comprises MoS$_2$ paint. In a still further aspect, the paint layer has a thickness from about 0.0001" to about 0.005". In a further aspect, the paint layer is from about 0.0005" to about 0.001" thick.

In a further aspect, the frangible projectile composition exhibits substantially reduced or eliminated barrel sparking than that of a reference frangible projectile composition consisting essentially of substantially the same proportions of the same powder metal component and same polymer, in the absence of the coating, under substantially identical firing conditions. In a yet further aspect, the frangible projectile composition exhibits substantially reduced or eliminated barrel wear than that of a reference frangible projectile composition consisting essentially of substantially the same proportions of the same powder metal component and polymer, in the absence of the coating, under substantially identical firing conditions.

In a further aspect, the frangible projectile composition is not damaged from the launching action of a firearm. In a yet further aspect, the frangible projectile composition is not damaged from the launching action of a firearm while exhibiting frangibility upon impact of a hard surface.

In a further aspect, the frangible projectile composition upon impact of a hard surface breaks into at least one fragment. In a yet further aspect, the frangible projectile composition upon impact of a hard surface breaks into at least one fragment. In a still further aspect, the frangible projectile composition upon impact of a hard surface breaks into at least one fragment, wherein the fragments are less than about 10 grains. In a further aspect, the fragments are less than about 5 grains. In a yet further aspect, the fragments are less than about 2 grains.

In a further aspect, the frangible projectile composition exhibits a weight from about 40 grains to about 300 grains. In a yet further aspect, the weight is from about 75 grains to about 110 grain, such as, for example, about 100 grains.

In a further aspect, the frangible projectile composition is frangible ammunition. In a yet further aspect, the frangible projectile composition is a frangible cartridge. In a still further aspect, the frangible projectile composition is a frangible bullet. In an even further aspect, the frangible projectile composition is 9 mm caliber, .40 caliber, .45 caliber, .357 caliber, .38 caliber, or .22 caliber. In a still further aspect, the frangible projectile composition is a 9 mm caliber frangible bullet. In still other aspects, a bullet can comprise any caliber and the present invention is not limited to any particular caliber size.

In one aspect, disclosed are articles prepared according to the method of the present invention. In a further aspect, the article is a projectile. In a still further aspect, the article is a bullet. In a yet further aspect, the article is a frangible projectile Methods of Making In various aspects, the invention relates to methods of preparing frangible compositions useful as frangible projectiles. In a further aspect, disclosed are methods of preparing a frangible projectile composition comprising: (a) providing a substantially homogenous powder metal composition; (b) pressing the powder metal composition to form a shaped green compact; (c) impregnating the green compact with a polymer; and (d) curing the green compact.

In a further aspect, the powder metal composition comprises ferrous powder, non-ferrous powder, refractory powder, magnetic powder, carbide powder, ceramic powder, noble metal powder, intermetallic powder, nano powder, mechanically-alloyed powder, graphite powder, alumina powder, metal-coated powder or a combination including at least one of the foregoing powders.

In a further aspect, the powder metal composition comprises iron, copper, tin, nickel, bronze, cobalt, aluminum, beryllium, titanium, magnesium, zinc, chromium, tungsten, bismuth, tantalum, molybdenum, niobium, rhenium, hafnium, vanadium, or a combination including at least one of the foregoing powder metals. In a yet further aspect, the powder metal composition comprises iron, copper, tin, zinc, or a combination including at least one of the foregoing powders. In an even further aspect, the powder metal composition comprises iron, tin, and zinc. In a still further aspect, wherein the powder metal composition comprises iron and copper. In a yet further aspect, the powder metal composition comprises copper-plated iron. In an even further aspect, the powder metal composition comprises iron, such as, for example, Arc-42 powder. In a still further aspect, the powder metal composition comprises from about 50% wt to about 98% wt of at least one metal.

In a further aspect, the polymer of the disclosed methods comprises a thermoplastic polymer. In a still further aspect, the polymer is an organic polymer. In a yet further aspect, the polymer comprises a thermoplastic or thermosetting polymer resin. In an even further aspect, the polymer comprises a thermoplastic resins or blends of thermoplastic resins. In a still further aspect, the polymer comprises a blend of one or more thermoplastic resins with one or more thermosetting resins.

In a further aspect, the thermoplastic polymer is a blend of polymers, copolymers, terpolymers, or combinations including at least one of the foregoing polymers. In a yet further aspect, the thermoplastic polymer is selected from polyethylene (PE), including high-density polyethylene (HDPE), linear low-density polyethylene (LLDPE), low-density polyethylene (LDPE), mid-density polyethylene (MDPE), glycidyl methacrylate modified polyethylene, maleic anhydride functionalized polyethylene, maleic anhydride functionalized elastomeric ethylene copolymers, ethylene-butene copolymers, ethylene-octene copolymers, ethylene-acrylate copolymers, such as ethylene-methyl acrylate, ethylene-ethyl acrylate, and ethylene butyl acrylate copolymers, glycidyl methacrylate functionalized ethylene-acrylate terpolymers, anhydride functionalized ethylene-acrylate polymers, anhydride functionalized ethylene-octene and anhydride functionalized ethylene-butene copolymers, polypropylene (PP), maleic anhydride functionalized polypropylene, glycidyl methacrylate modified polypropylene, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polyoxymethylenes, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyurethanes, or the like, or a combination including at least one of the foregoing organic polymers.

In a further aspect, the polymer comprises polyacrylate, polymethacrylate, polyvinyl alcohol, polyurethane, polyolefin, polyester, acrylic polyamide polymer, or a combination including at least one of the foregoing polymers. In a yet further aspect, the polymer is acrylonitrile-butadiene-styrene/nylon, polycarbonate/acrylonitrile-butadiene-styrene, polyphenylene ether/polystyrene, acrylate/polyamide, polyphenylene ether/polyamide, polycarbonate/polyester, polyphenylene ether/polyolefin, and combinations including at least one of the foregoing blends of resins.

In a further aspect, the polymer comprises an acrylate polymer. In a yet further aspect, the acrylate polymer comprises salts of acrylic acid, esters of acrylic acid, salts of methacrylic acid, esters of methacrylic acid, acrylonitrile, methacrylate, methyl acrylate, methyl methacrylate, ethyl acrylate, 2-chloroethyl vinyl ether, 2-ethylhexyl acrylate, hydroxyethyl methacrylate, butyl acrylate, butyl methacrylate, trimethylolpropane triacrylate, or a combination including at least one of the foregoing acrylates. In a specific aspect, the polymer comprises methacrylate, such as, for example, Loctite® RTC.

In a further aspect, disclosed are methods wherein the pressing step is for a sufficient time and sufficient pressure to form a green compact. In a yet further aspect, the formed green compact is pressed using a pressing apparatus. In a still further aspect, the pressing apparatus is an uniaxial high speed press. In an even further aspect, the pressing apparatus is an uniaxial press with one or more die cavities.

In a further aspect, the green compact is formed in a substantially spherical shape. In a yet further aspect, the green compact is formed in substantially conical shape.

In a further aspect, the green compact is pressed using a uniaxial press with a load from about 1.0 ton (T) to about 4.0 T. In a yet further aspect, the load is at least about 1.0 T, at least about 1.5 T, at least about 2.0 T, at least about 2.5 T, at least about 3.0 T, at least about 3.5 T, at least about 4.0 T.

In a further aspect, the formed green compact exhibits sufficient green strength for handling after the pressing step. In a yet further aspect, the green compact density is from about 5.0 g/cm$^3$ to about 7.5 g/cm$^3$. In a still further aspect, the green compact density is from about 6.2 g/cm$^3$ to about 6.4 g/cm$^3$. In an even further aspect, the green compact exhibits a sufficient porosity to accommodate a thermoplastic polymer.

In a further aspect, disclosed are methods, wherein the polymer is incorporated by impregnation. In a yet further aspect, the polymer is incorporated by impregnation under vacuum. In a further aspect, the vacuum is from about 1 in Hg to about 50 in Hg. In a yet further aspect, the vacuum is at least 1 in Hg, at least about 10 in Hg, at least about 20 in Hg. In a specific aspect, the vacuum is about 30 in Hg. In a further aspect, the impregnation further comprises centrifugation.

In a further aspect, the polymer is incorporated into the frangible projectile composition through pores in the green compact. In a yet further aspect, the green compact is immersed in a polymer bath for a sufficient time and sufficient pressure to substantially fill all pores in the green compact with the polymer. In a still further aspect, the pores are least partially filled with polymer in a portion of the pores.

In a further aspect, the polymer incorporation does not substantially affect overall dimension of the frangible projectile composition. In a yet further aspect, substantially no polymer is present on the surface of the final frangible projectile composition after polymer impregnation.

In a further aspect, the curing comprises heating the green compact at a sufficient temperature and for a sufficient time to strengthen the green compact. In a yet further aspect, the curing is performed in an anaerobic environment. In a still further aspect, the curing is performed in a water bath. In an even further aspect, the curing environment is a temperature from about 0° C. to about 200° C. In a further aspect, the curing environment is a temperature of less than about 100° C. Thus, in a further aspect, the methods of the present invention need a reduced level of debinding and/or sintering. In a yet further aspect, the methods of the present invention completely eliminate the need for debinding and/or sintering.

In a further aspect, the method further comprises machining the green compact. In a yet further aspect, the green compact is machined prior to introduction of the polymer. In a still further aspect, the green compact is machined after introduction of the polymer.

In a further aspect, the shaped green compact exhibits sufficient green strength for machining. In a yet further aspect, the shaped green compact exhibits sufficient green strength for machining after curing.

In a further aspect, disclosed are methods wherein the final frangible projectile composition is substantially spherical in shape. In a yet further aspect, the final frangible projectile composition is substantially conical in shape.

In a further aspect, disclosed are methods of preparing frangible projectile composition, wherein the frangible projectile composition exhibits a vertical strength from about 500 to about 800 lbs. In a yet further aspect, the frangible projectile composition exhibits a vertical strength from about 650 to about 750 lbs. In a still further aspect, the frangible projectile composition exhibits a vertical strength from about 500 to about 800 lbs after curing. In an even further aspect, the frangible projectile composition exhibits a vertical strength from about 650 to about 750 lbs after curing.

In a further aspect, the frangible projectile composition exhibits a transverse strength from about 200 to about 500 lbs. In a yet further aspect, the frangible projectile composition exhibits a transverse strength from about 300 to about 400 lbs. In a still further aspect, the frangible projectile composition exhibits a transverse strength from about 200 to about 500 lbs after curing. In an even further aspect, the frangible projectile composition exhibits a transverse strength from about 300 to about 400 lbs after curing.

In a various aspects, the methods can further comprise additional mechanical and/or chemical processing steps.

In a further aspect, the additional processing, if performed, comprises chemical treating with a finishing agent. In a yet further aspect, the finishing agent is acetic acid.

In a further aspect, the additional processing, if performed, comprises applying at least one outer coating layer. In a yet further aspect, the outer coating layer comprises a friction resistant or lubricating material.

In a further aspect, the additional processing, if performed, comprises electroplating or other plating method. In yet further aspect, the plated layer comprises a metal selected from copper, zinc, iron, steel, antimony, nickel and tungsten. In a still further aspect, the plated layer comprises copper. In an even further aspect, the plated layer comprises zinc. In a still further aspect, the plated layer has a thickness from about 0.001" to about 0.01". In a yet further aspect, the plated layer is from about 0.001" thick to about 0.006" thick.

In a further aspect, the additional processing comprises applying at least one paint coating layer. In a yet further aspect, the paint coating layer comprises $MoS_2$ paint. In a still further aspect, the paint layer has a thickness from about 0.0001" to about 0.005". In an even further aspect, the paint layer has a thickness from about 0.0005" to about 0.001".

In a further aspect, following the additional processing, the frangible projectile composition can exhibit substantially reduced or eliminated barrel sparking than that of a reference frangible projectile composition consisting essentially of substantially the same proportions of the same powder metal component and same polymer, in the absence of the coating, under substantially identical firing conditions. In a yet further aspect, the frangible projectile composition can exhibit substantially reduced or eliminated barrel wear than that of a reference frangible projectile composition consisting essentially of substantially the same proportions of the same powder metal component and polymer, in the absence of the coating, under substantially identical firing conditions.

In a further aspect, frangible projectile compositions prepared using methods of the present invention is not damaged from the launching action of a firearm. In a yet further aspect, the frangible projectile composition is not damaged from the launching action of a firearm while exhibiting frangibility upon impact of a hard surface. In a still further aspect, the frangible projectile composition breaks into at least one fragment upon impact of a hard surface. In a further aspect, the fragments are less than about 10 grains. In a yet further aspect, the fragments are less than about 5 grains. In a still further aspect, the fragments are less than about 2 grains. In an even further aspect, the fragments comprise dust.

In a further aspect, frangible projectile compositions prepared using the disclosed methods exhibits a weight from about 40 grains to about 300 grains. In a yet further aspect, the weight is from about 75 grains to about 110 grain, such as, for example, about 100 grains.

In various aspects, the disclosed methods can be used to prepare frangible projectile compositions having a variety of calibers. In a further aspect, the frangible projectile composition is 9 mm caliber, .40 caliber, .45 caliber, .357 caliber, .38 caliber, or .22 caliber. In a specific aspect, the frangible projectile composition is a 9 mm caliber frangible bullet.

In a further aspect, the disclosed methods can be used to prepare frangible projectiles, such as, for example, frangible ammunition. In a yet further aspect, the frangible projectile composition is a cartridge In a still further aspect, the frangible projectile composition is a bullet.

EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Several methods for preparing the compounds of this invention are illustrated in the following Examples. Starting materials and the requisite intermediates are in some cases commercially available, or can be prepared according to literature procedures or as illustrated herein.

Preparation of the Compositions

Generally, net shaped parts can be made using a high speed uniaxial press with one or more die cavities and any powder material capable of being pressed into a green compact (part). In one aspect, the powder material will have sufficient porosity to accommodate a polymer after pressing. The green compacts are not pressed to near full theoretical density, as in steel (or iron) parts, and therefore, can optionally have a binder present in the powder material. The selected green density will vary based on, amongst other things, the powder composition and the polymer used in the subsequent impregnation step. For example, for the inexpensive iron powder used in the following examples, the minimum green density was observed to be from about is 6.2 g/cm$^3$ to 6.4 g/cm$^3$. The green compact should be sufficiently strong for handling, yet retain enough porosity to accommodate the necessary binder. Following pressing, the green compacts undergo binder impregnation to add strength. In one aspect, green parts can be immersed in a bath of polymer and impregnated under vacuum pressure until the desired porosity has been filled, and then cured. In a further aspect, the green parts can undergo additional pressurized processing to drive polymer into part voids. The green parts are then removed from the bath, excess binder spun off in a centrifuge, spin washed in water, and spin dried. In an alternative aspect, the parts can be washed with acetone prior to curing.

The curing process can occur in an aerobic or anaerobic environment, having a temperature of greater that about 30° C., for a sufficient time to strengthen the part. For example, a suitable anaerobic curing environment for methacrylate polymer can be a >95° C. water bath for about 10 minutes. Approximately 10,000 parts can be processed in 20 minutes using this method. As evidenced, debinding and sintering are not required with this method. FIG. 1 provides a schematic illustration of an exemplary method of the present invention.

Optionally, the parts can undergo additional mechanical or chemical processing. For example, the part can be coated with an additional layer, such as with electroplating or with paint. In a further aspect, the parts can be made to smaller dimensions in order to accommodate the extra layer and still meet dimensional specification. In a still further aspect, the part can be chemically treated, such as, for example, with a finishing agent. In a yet further aspect, the part can be mechanically treated, such as, for example, to remove residual material or enhance mechanical properties.

Performance Testing

Generally, launch survival can be assessed using a truth screen test (cardboard piece with clean, round holes) to verify the bullet was intact after launch. In a further aspect, barrel and target sparking tests can be performed to assess bullet sparking wear. In a further aspect, by firing and striking the projectiles upon a hard surface, for example, a 4340 steel block, fragmentation can be assessed by observing the disintegration behavior, such as into dust or fragments, for example, <2 grains.

Example 1

Metal powder (Zn (20%), Sn (10%), bal. Fe) was pressed to form green compacts by employing a Hydramet uniaxial high speed press using a load of 2.5 T to 3.0 T. The parts where then immersed in a bath of epoxy resin (Stycast® 1266) and impregnated under vacuum until all porosity has been filled. The parts were then removed from the bath, excess polymer spun off in a centrifuge, dipped in acetone, and spin dried in a centrifuge. The parts were then cured at 60° C. for 10 minutes. The compositions in Table 1 were prepared with methods identical or analogous to method 1 shown herein.

TABLE 1

| Composition | Attribute | Run 1 | Run 2 |
| --- | --- | --- | --- |
| Fe, Zn, and Sn; Stycast ® 1266 epoxy resin | N | 16 | 35 |
| | Avg. wt. +/− stdev, grams | 6.2897 +/− .0565 | 6.3508 +/− .0783 |
| | Avg. density +/− stdev, g/cm$^3$ | 6.112 +/− 0.030 (avg of 3 randomly selected samples) | 6.215 +/− .0050 (avg of 5 randomly selected samples) |
| | Avg. dia. +/− stdev, inches | .3557 +/− .0003 | .3555 +/− .0001 |
| | Avg. length +/− stdev, inches | .7439 +/− .0021 | .7402 +/− .0055 |

Example 2

Arc Metals' Arc-42 powder (composition 0.70% lubricant, 0.76% graphite, 2.33% Cu, <2.00% other unlisted elements, 0.244% zinc stearate, bal. Fe) was pressed to form green compacts by employing a Hydramet uniaxial high speed press using a load of 2.5 T to 3.0 T. The parts where then immersed in a bath of methacrylate polymer (Loctite® RTC) and impregnated under vacuum (−30 inHg) until all bubbling disappears, a sign that all porosity has been filled. The parts were then removed from the bath, excess polymer spun off in a centrifuge, spin washed in water, and spin dried. The anaerobic curing environment comprised a >95° C. water bath for 10 minutes. The following compositions in Table 2 and Table 3 were prepared with identical or analogous to methods shown herein.

TABLE 2

| Composition | Attribute | Run 1 | Run 2 |
|---|---|---|---|
| Fe, Zn (20%), Sn (10%); Methacrylate polymer | N | 50 | |
| | Avg. wt. +/− stdev, grams | 6.2856 +/− .0640 | |
| | Avg. dia. +/− stdev, inches | .3551 +/− .0008 | |
| | Avg. length +/− stdev, inches | .7399 +/− .0053 | |

TABLE 3

| Composition | Attribute | Run 1 | Run 2 |
|---|---|---|---|
| Fe powder | N | 472 | |
| | Avg. wt. +/− stdev, grains | 85.3 +/− .4 | |
| | Avg. dia. +/− stdev, inches | .3464 +/− .0001 | |
| | Avg. length +/− stdev, inches | .689 +/− .002 | |
| Cu-plated Fe powder | N | 60 | |
| | Avg. wt. +/− stdev, grains | 67.4 +/− 2.0 | |
| | Avg. dia. +/− stdev, inches | .3465 +/− .0000 | |
| | Avg. length +/− stdev, inches | .688 +/− .001 | |

Example 3

Figure 2:
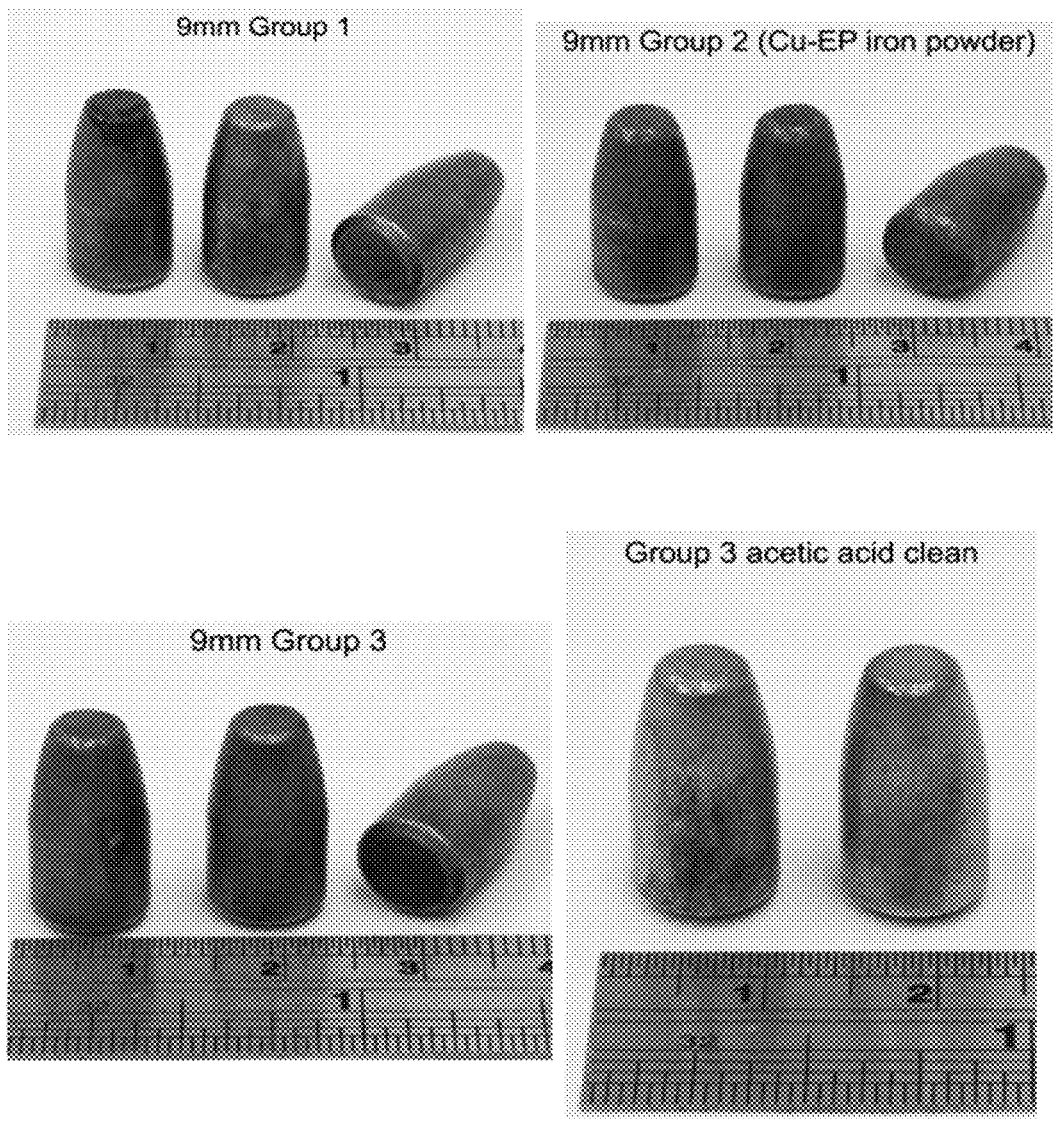
FIG. 2 shows pressed parts made in accordance with the present invention.
Figure 3:
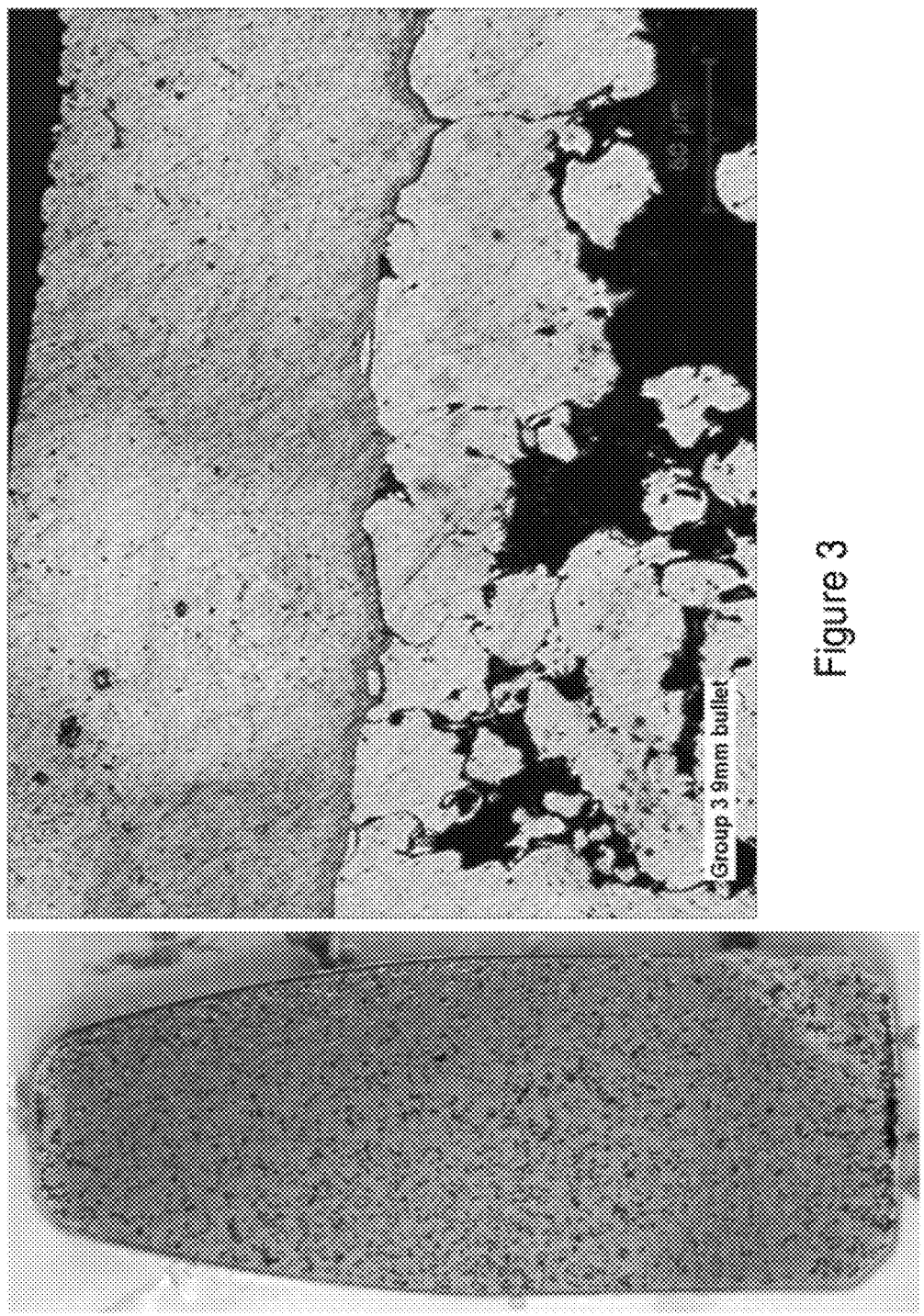
FIG. 3 shows Cu-plated pressed parts made in accordance with the present invention.

The following compositions in Table 4 were prepared with identical or analogous to methods shown herein, except that the parts were pressed with 0.005" offset to accommodate an electroplated copper coating (FIG. 2). The Cu layer exhibited good adherence to the pressed Fe parts (FIG. 3). Certain parts were also subjected to additional chemical processing with acetic acid (FIG. 2). The composition characterization data is set forth below in Table 4.

TABLE 4

| Composition | Attribute | Run 1 | Run 2 |
|---|---|---|---|
| Fe powder; partial methacrylate polymer impregnation (Group 1) | N | 6 | |
| | Avg. wt. +/− stdev, grains | 94.1 +/− 1.1 | |
| | Avg. density +/− stdev, g/cm³ | 6.3138 +/− .0340 | |
| | Avg. dia. +/− stdev, inches | .3565 +/− .0013 | |
| | Avg. length +/− stdev, inches | .7006 +/− .002 | |
| Cu-plated Fe powder; full methacrylate polymer impregnation (Group 2) | N | 3 | |
| | Avg. wt. +/− stdev, grains | 77.0 +/− 3.0 | |
| | Avg. density +/− stdev, g/cm³ | 5.270 +/− 0.166 | |
| | Avg. dia. +/− stdev, inches | .3544 +/− .0004 | |
| | Avg. length +/− stdev, inches | .6926 +/− .0014 | |
| Fe powder; full methacrylate polymer impregnation (Group 3) | N | 8 | |
| | Avg. wt. +/− stdev, grains | 94.2 +/− .4 | |
| Fe powder; full methacrylate polymer impregnation (Group 3) | Avg. density +/− stdev, g/cm³ | 6.374 +/− 0.031 | |
| | Avg. dia. +/− stdev, inches | .3546 +/− .0005 | |
| | Avg. length +/− stdev, inches | .7088 +/− .0023 | |

Performance and Ballistics Testing Data

Figure 4:
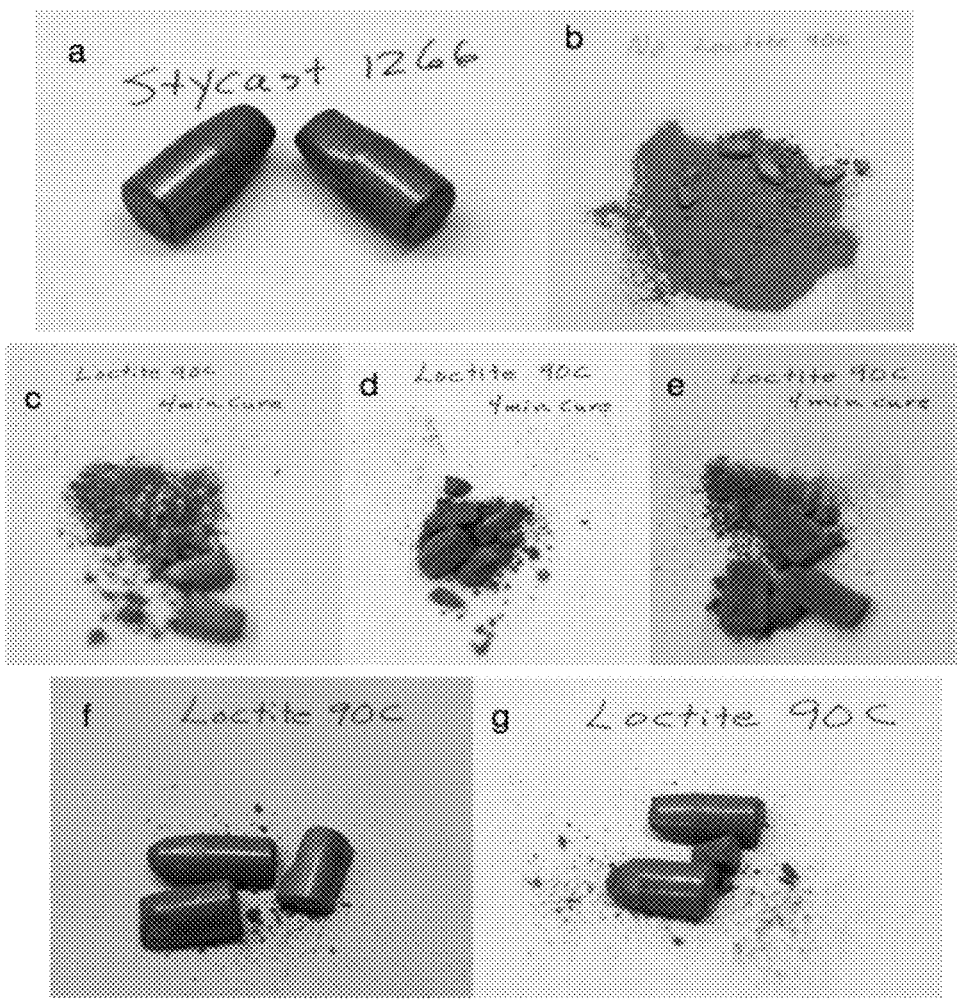
FIG. 4 shows results from crush tests performed on pressed parts made in accordance with the present invention.

Crush tests were performed on compositions made in accordance with the present invention to evaluate whether the parts exhibited requisite strength. Parts cured for different intervals were subjected to a compressive crush pressure of 100 N, powder with no impregnation is provided in FIG. (4 b). Parts made with methacrylate polymer and cured for 4 minutes at 90° C. showed insufficient strength (FIGS. 4c-4e). However, the results indicate that a cure time of 10-15 minutes yields parts with sufficient strength for firing (FIGS. 4f-4g).

Figure 5:
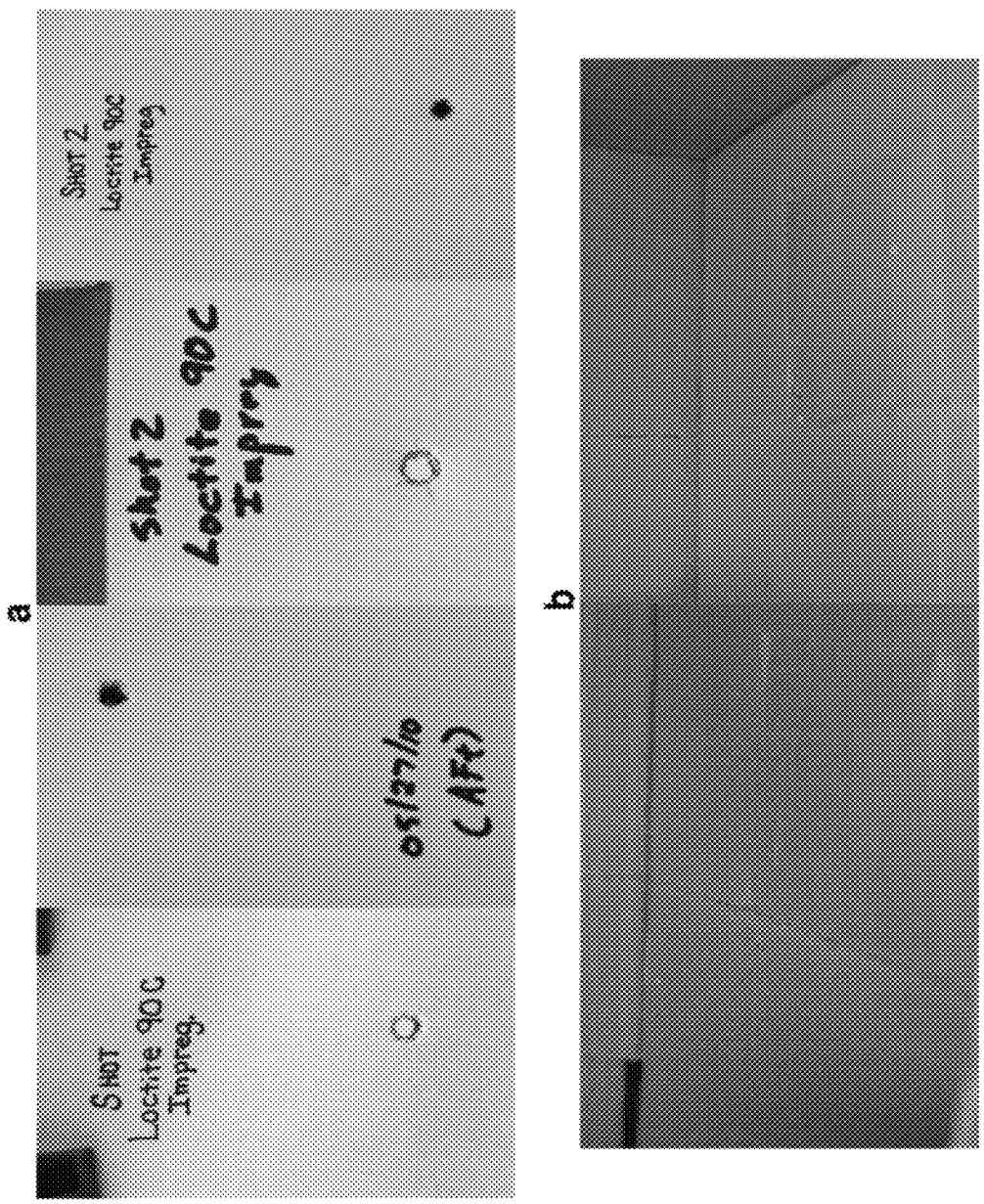
FIG. 5 shows results from truth screen tests performed on pressed parts made in accordance with the present invention.
Figure 6:
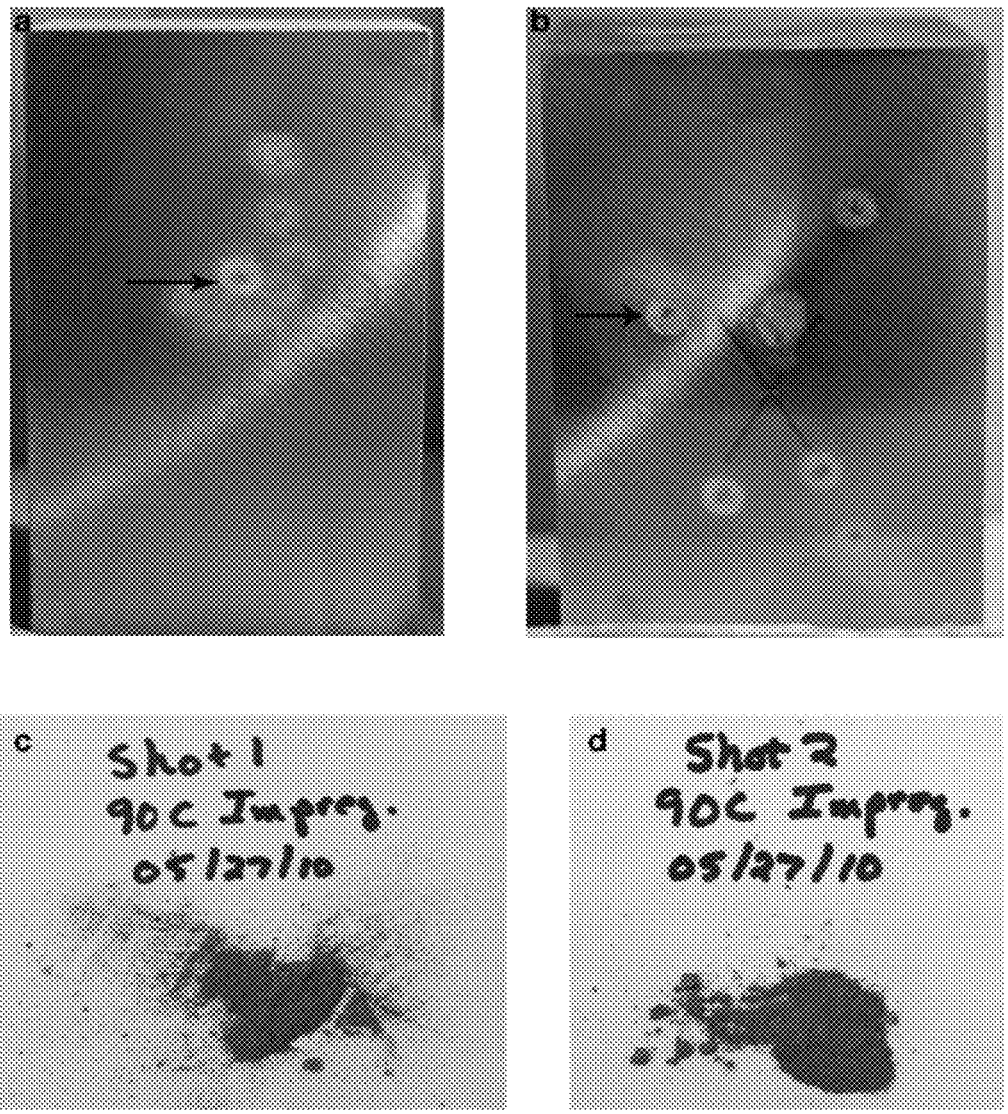
FIG. 6 shows results from frangibility tests performed on pressed parts made in accordance with the present invention.

In addition, tests were performed on compositions made in accordance with the present invention to evaluate impact strength and frangibility. Parts were prepared with identical or analogous methods using methacrylate polymer and 10 minute cure time at 90° C. The truth cards showed clean, circular entry holes (FIG. 5a), and limited dusting was seen inside the cardboard box (FIG. 5b) indicating the projectiles survived launch. After firing, the projectiles also deposited a circular impact pattern on the steel block target (FIGS. 6a-6b) while fragmenting upon impact (FIGS. 6c-6d). Fragments collected averaged from 0.059 grams.

Figure 7:
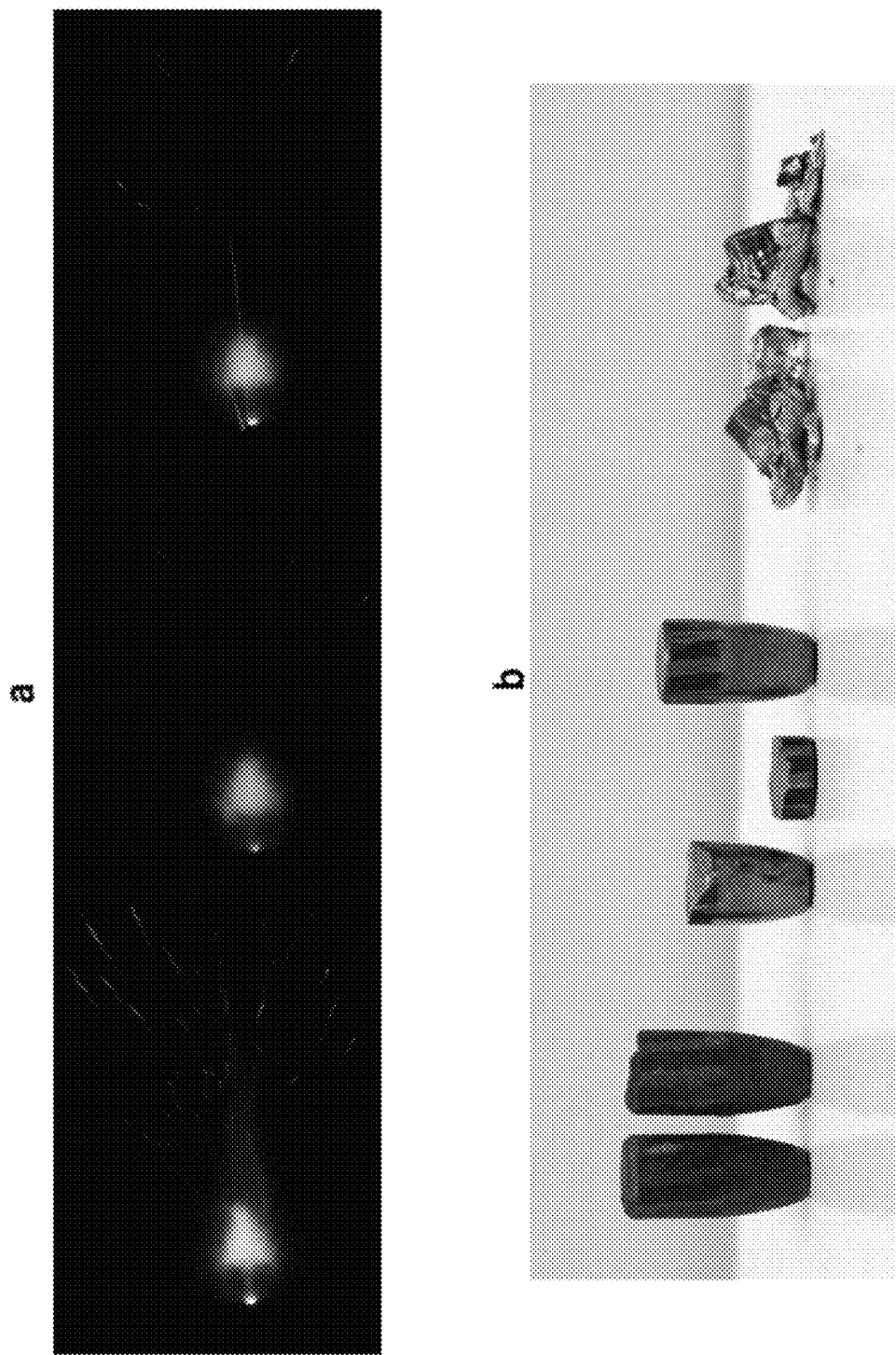
FIG. 7 shows results from firing tests performed on pressed parts made in accordance with the present invention.
Figure 8:
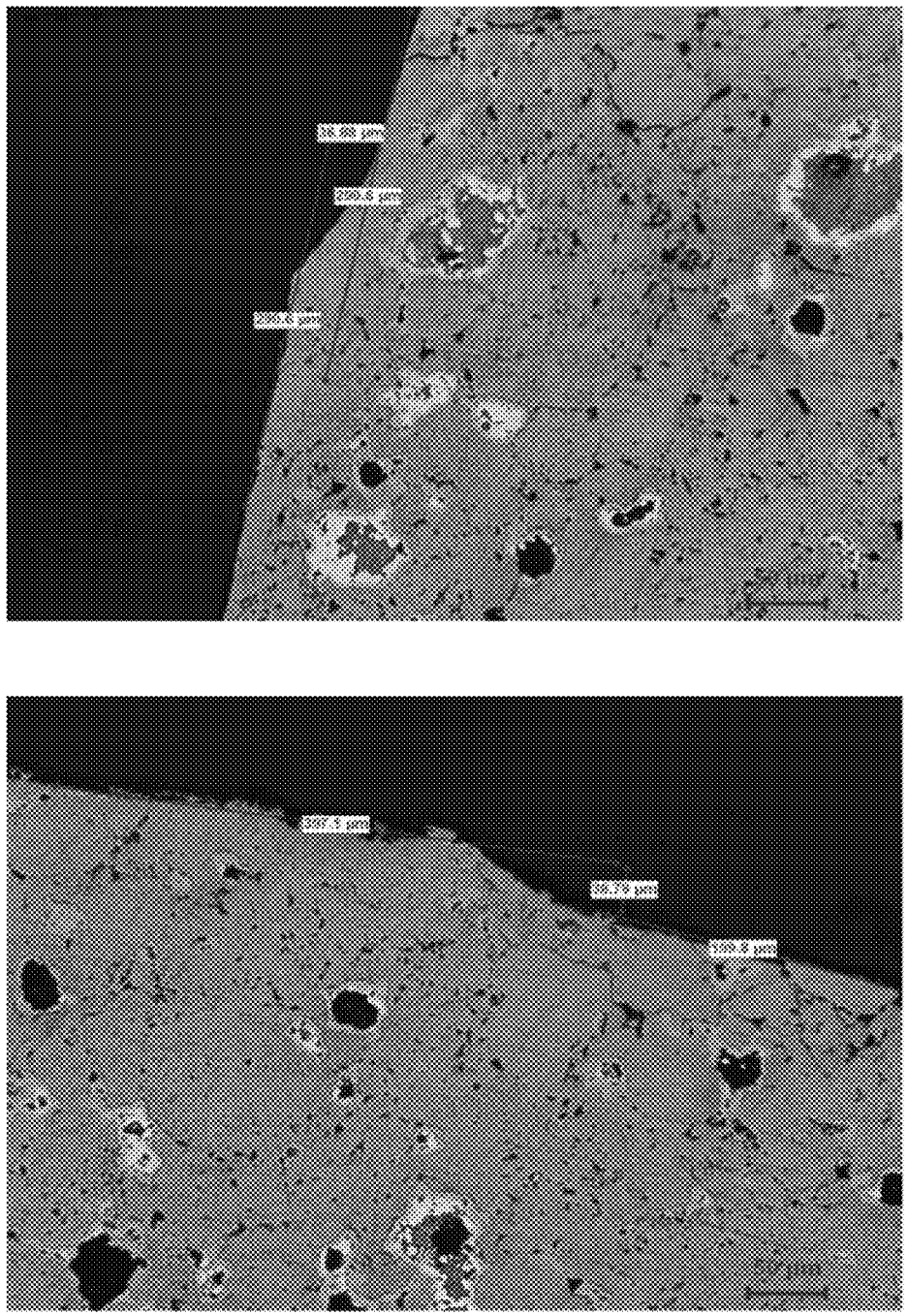
FIG. 8 shows results from rifling effects as visualized by optical microscopy.

In addition, tests were performed on compositions made in accordance with the present invention to evaluate barrel sparking. Parts were prepared with identical or analogous methods described herein, except the projectiles were hand painted with $MoS_2$ paint. Although the MoS2/resin (Fe core) had some reduced sparking (FIG. 7a), the performance could be a possible effect of inconsistent hand painted coating. The commercial 9 mm slug & frangible projectile did not exhibit sparking, however projectile surface was observed to deform as it traveled through barrel rifling (FIG. 7b), and where the inconsistent 0.0005" thick $MoS_2$ coating was broken, Fe to steel friction resulted in sparking. Rifling appears to produce a ridge about 0.003 to 0.005 µm tall, or 0.0012" to 0.0016" tall as measured by optical microscopy (FIG. 8). Therefore, a thicker coating may deform with bullet and not expose Fe substrate, such as a 0.003" to 0.005" thick coating.

Cu-Electroplated 9 mm Bullet Tests

Parts were prepared with identical or analogous methods using methacrylate polymer and 10 minute cure time at 90° C., and electroplated with an approximately 0.005" Cu layer.

Figure 9:
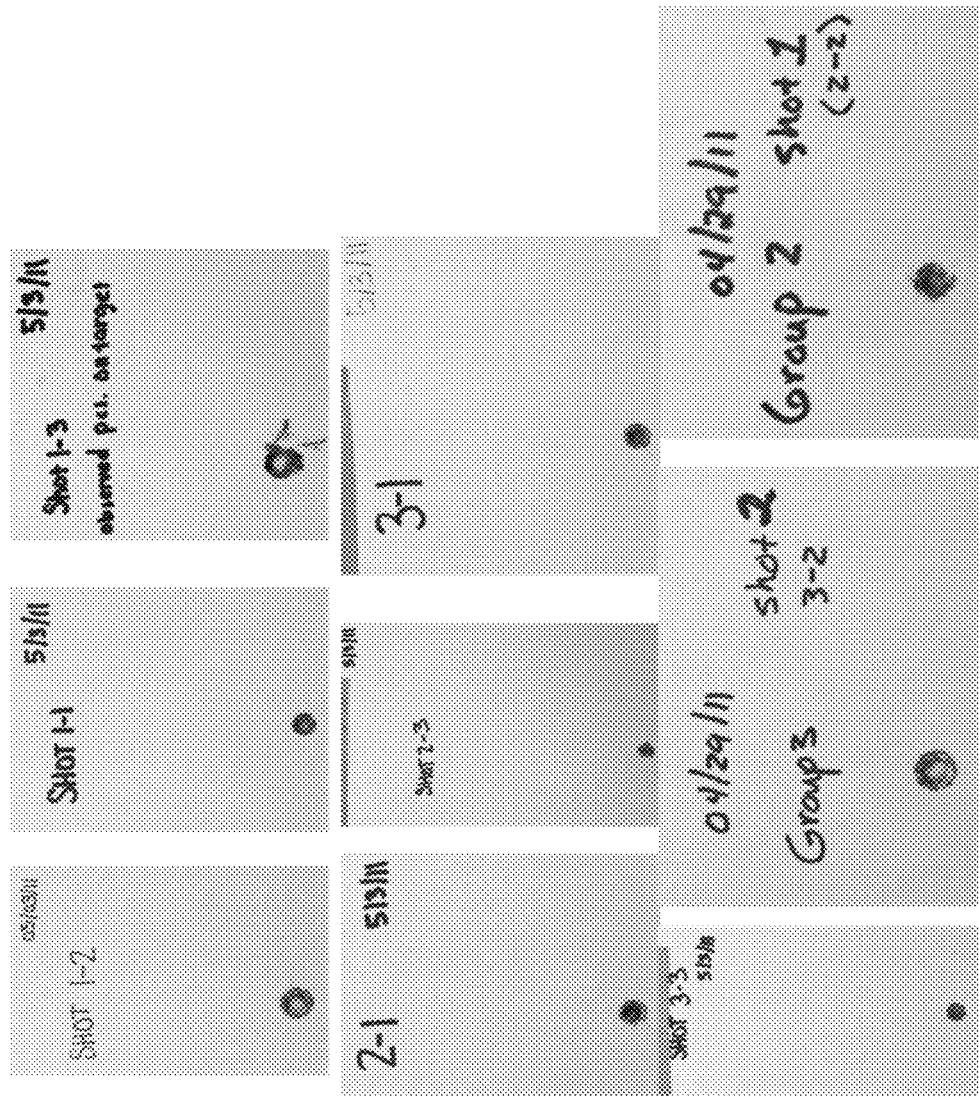
FIG. 9 shows results from truth screen tests performed on pressed parts made in accordance with the present invention.
Figure 10:
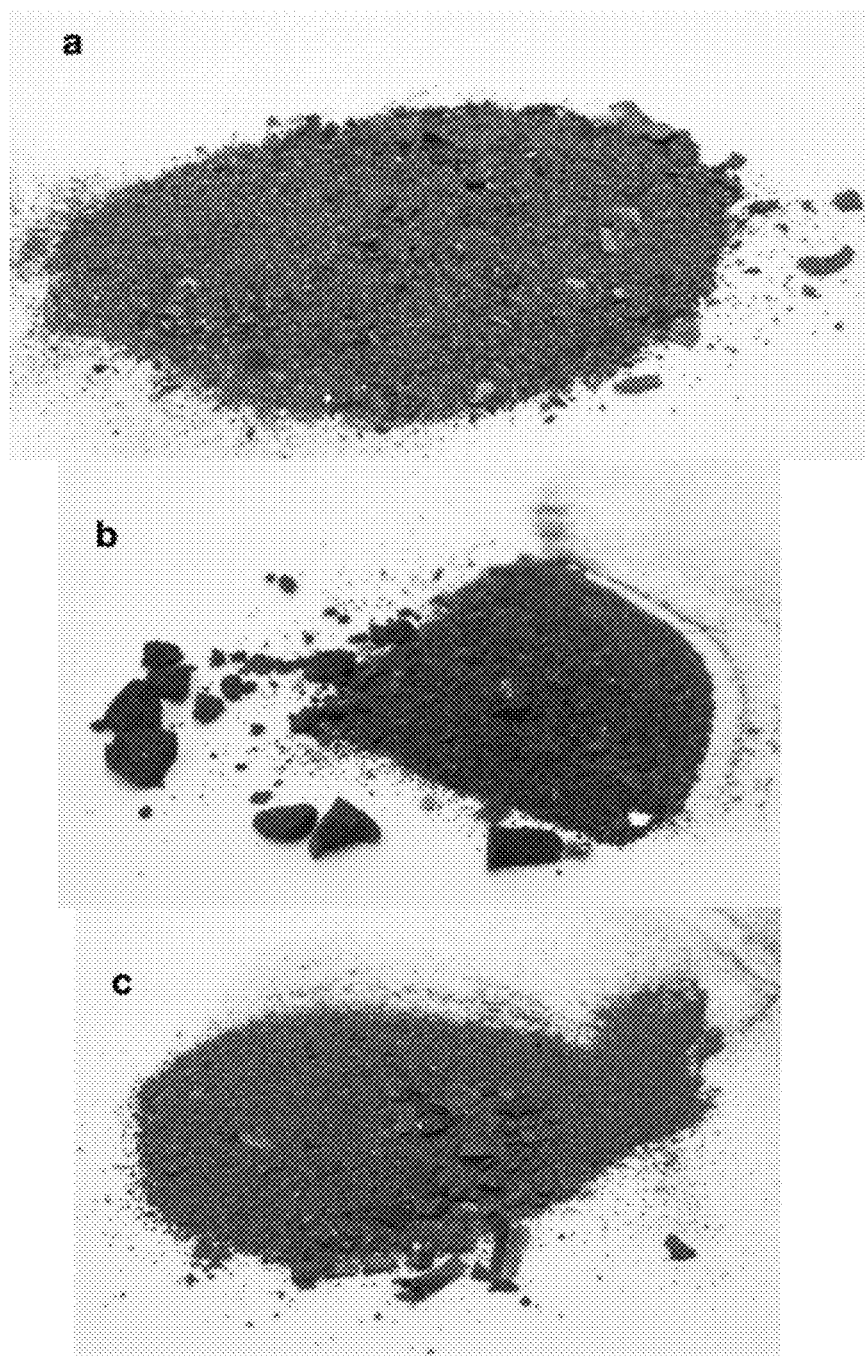
FIG. 10 shows results from frangibility tests performed on pressed parts made in accordance with the present invention.

Tests were performed on compositions made in accordance with the present invention to evaluate impact strength and frangibility as described above. The truth cards results for all three groups showed clean, circular entry holes (FIG. 9), indicating all projectiles survived launch. Upon impact with the steel block target, the three groups showed varying fragmentation. Group 1 showed an average large Cu fragment size at 0.2 grains with a maximum fragment size at 0.26 grains (FIG. 10a). Group 2 showed the worst performance, with a larger average Cu fragment size at 1.2 grains and a maximum fragment size at 1.3 grains (FIG. 10b). Group 3 showed the smallest average fragment size (Cu and Fe) at 0.14 grains with a maximum fragment size at 0.2 grains (Fe and Cu) (FIG. 10c).

Figure 11:
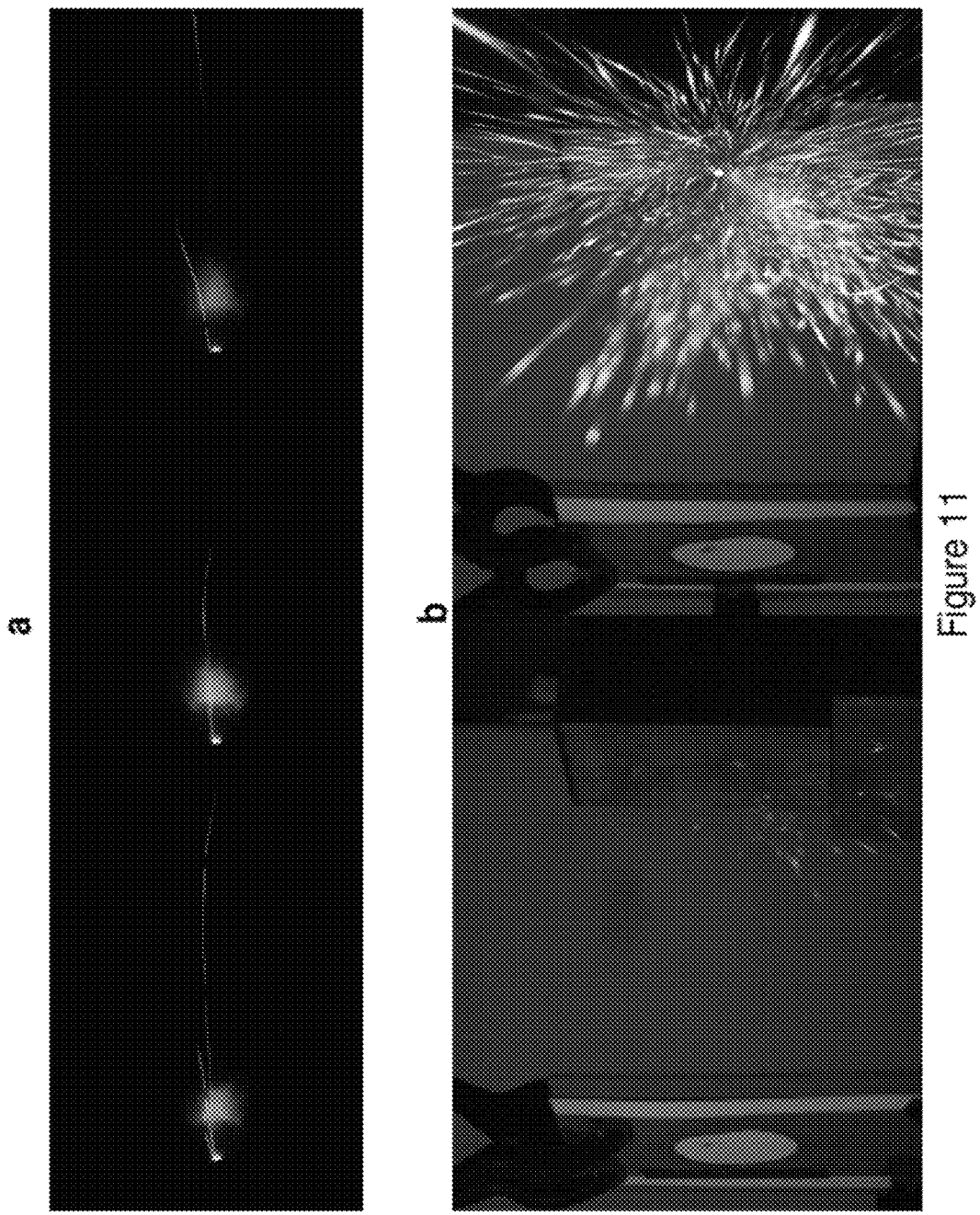
FIG. 11 shows results from firing tests performed on pressed parts made in accordance with the present invention.
Figure 12:
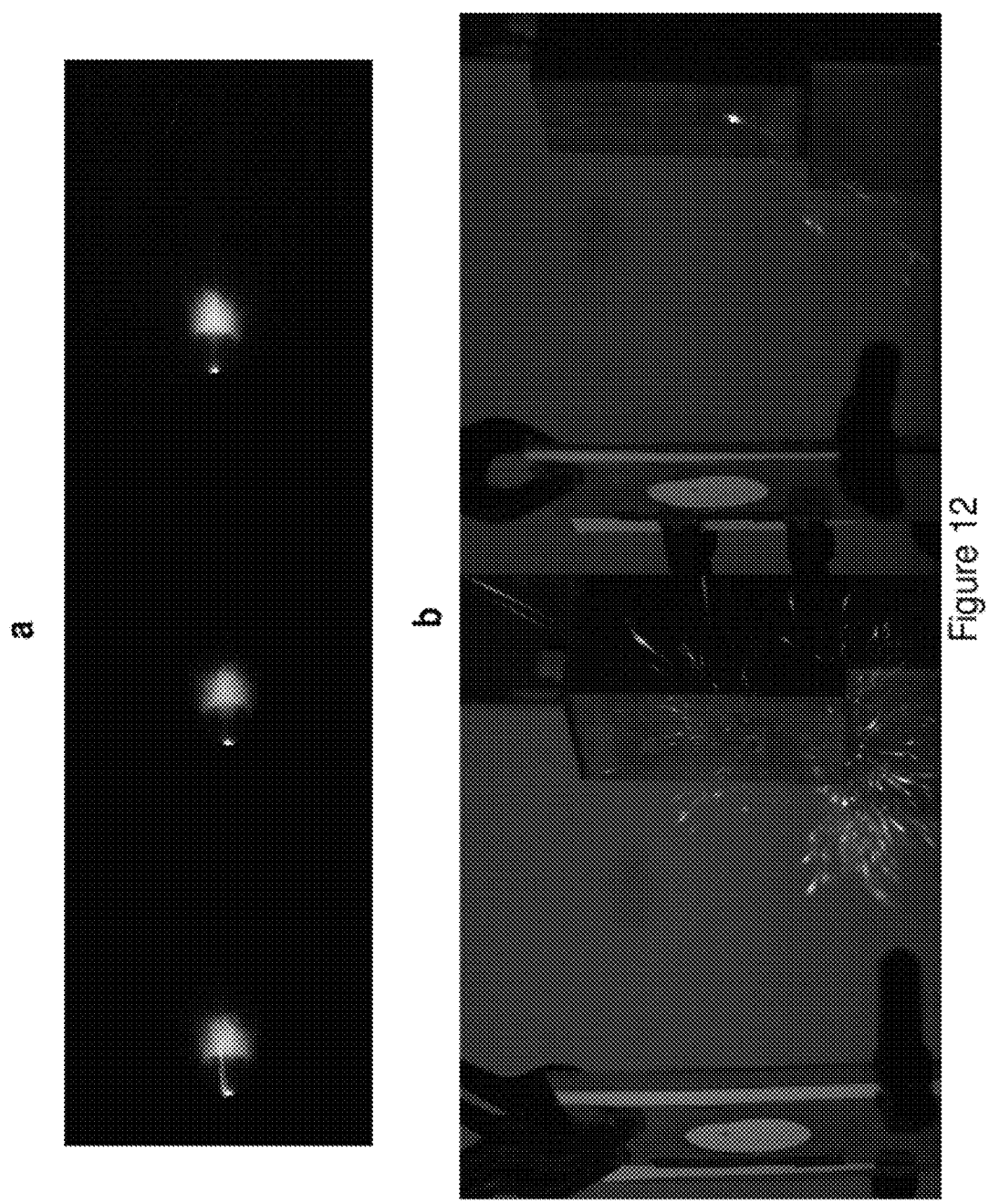
FIG. 12 shows results from firing tests performed on pressed parts made in accordance with the present invention.
Figure 13:
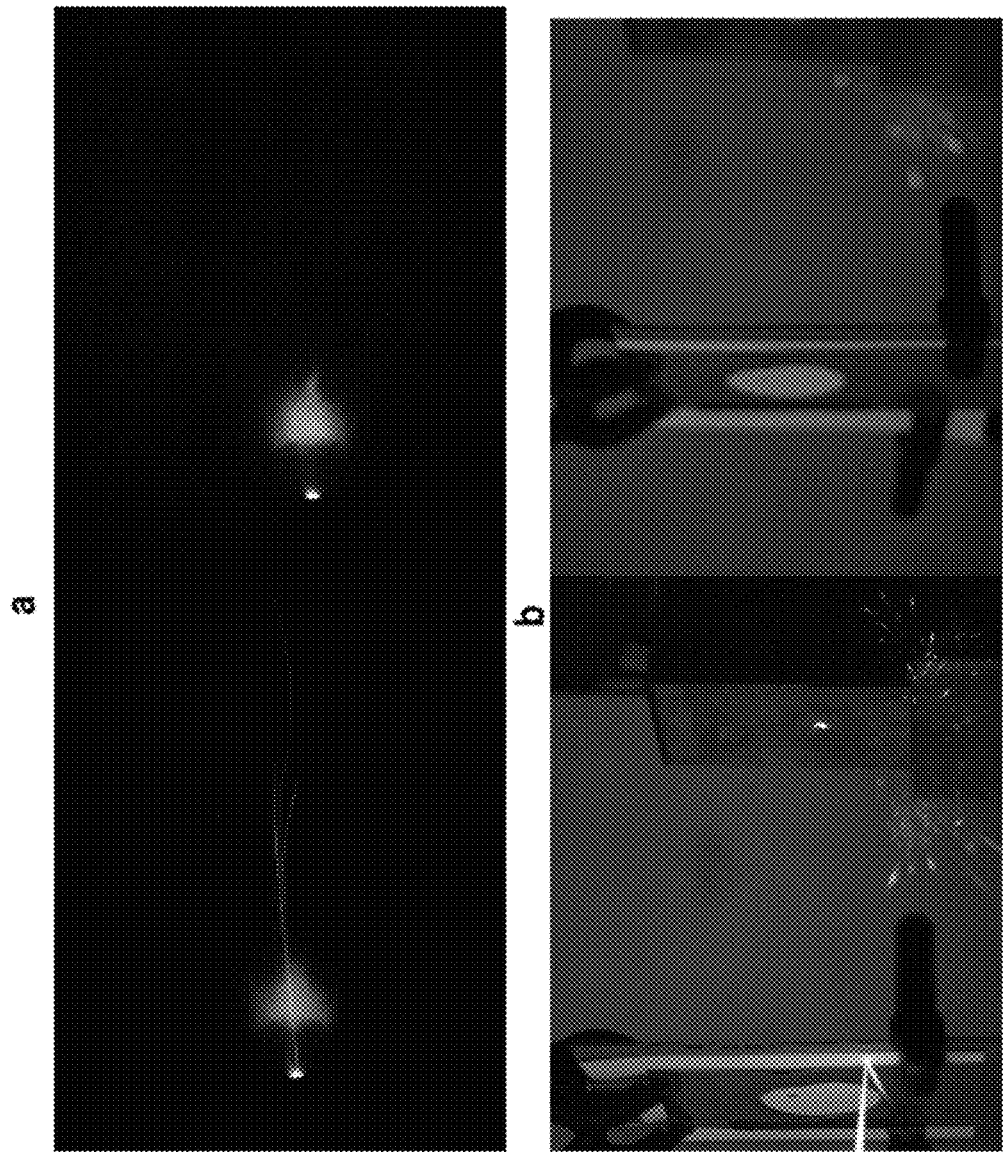
FIG. 13 shows results from firing tests performed on pressed parts made in accordance with the present invention.

In addition, tests were performed on compositions made in accordance with the present invention to evaluate barrel and target sparking. Group 1 had the worst performance, showing 0-3 streaks of varying length (FIG. 11a) at the muzzle and substantial sparking upon striking the target (FIG. 11b). Group 2 showed reduced streaking (FIG. 12a) at the muzzle and reduced sparking upon striking the target (FIG. 12b). Group 3 also showed reduced streaking (FIG. 13a) at the muzzle and reduced sparking upon striking the target (FIG. 13b).

What is claimed is:

1. A method of preparing a frangible projectile composition comprising:
   (a) pressing a powder metal composition to form a shaped green compact exhibiting a density of from about 5.0 g/cm$^3$ to 7.5 g/cm$^3$;
   (b) impregnating the green compact with an acrylate polymer; wherein the acrylate is present in an amount from about 2% to about 4% of a final frangible projectile part weight; and
   (c) curing the green compact.

2. The method of claim 1, further comprising machining the green compact.

3. The method of claim 1, wherein the powder metal composition comprises ferrous powder, non-ferrous powder, refractory powder, magnetic powder, carbide powder, ceramic powder, noble metal powder, intermetallic powder, nano powder, mechanically-alloyed powder, graphite powder, alumina powder, metal-coated powder or a combination including at least one of the foregoing powders.

4. The method of claim 1, wherein the powder metal composition comprises iron, copper, tin, nickel, bronze, cobalt, aluminum, beryllium, titanium, magnesium, zinc, chromium, tungsten, bismuth, tantalum, molybdenum, niobium, rhenium, hafnium, vanadium, or a combination including at least one of the foregoing powder metals.

5. The method of claim 1, wherein the powder metal composition comprises iron, copper, tin, zinc, or a combination including at least one of the foregoing powders.

6. The method of claim 1, wherein the polymer comprises a thermoplastic or thermosetting polymer resin.

7. The method of claim 1, wherein the pressing is for a sufficient time and sufficient pressure to form a green compact.

8. The method of claim 1, wherein the green compact exhibits sufficient green strength for handling after the step of pressing.

9. The method of claim 1, wherein the polymer is incorporated by impregnation.

10. The method of claim 1, where in the green compact is immersed in a polymer bath for a sufficient time and sufficient pressure to fill all pores in the green compact.

11. The method of claim 1, wherein the frangible projectile composition exhibits a vertical strength from about 500 to about 800 lbs.

12. The method of claim 1, further comprising forming a frangible projectile from the cured green compact.

13. The method of claim 12, further comprising a post processing step wherein at least one outer coating layer is applied to the frangible projectile.

14. The method of claim 13, wherein the frangible projectile exhibits reduced or eliminated barrel sparking than that of a reference frangible projectile consisting essentially of the same proportions of the same powder metal component and same polymer, in the absence of the at least one outer coating layer, under identical firing conditions.

15. The method of claim 13, wherein the frangible projectile exhibits reduced or eliminated barrel wear than that of a reference frangible projectile consisting essentially of the same proportions of the same powder metal component and polymer, in the absence of the at least one outer coating layer, under identical firing conditions.

16. The method of claim 13, wherein the at least one coating layer comprises a friction resistant or lubricant material.

17. The method of claim 13, wherein the at least one coating layer comprises an electroplated or other plated layer.

18. The method of claim 13, wherein the at least one coating layer comprises copper, zinc, iron, steel, antimony, nickel, tungsten, or a combination thereof.

19. The method of claim 13, wherein the at least one coating layer comprises copper, zinc, or a combination thereof.

20. The method of claim 13, wherein the at least one coating layer comprises a paint coating layer.

21. The method of claim 13, wherein the at least one coating layer has a thickness from about 0.001" to about 0.01".

22. The method of claim 12, wherein no polymer is present on a surface of the frangible projectile.

23. The method of claim 1, wherein the acrylate polymer comprises a methacrylate.

24. The method of claim 1, wherein the powder metal composition does not comprise a polymer prior to pressing.

25. The method of claim 1, wherein the shaped green compact has a density from about 6.0 g/cm$^3$ to about 6.5 g/cm$^3$.

26. The method of claim 1, wherein the powder metal composition does not comprise a binder prior to pressing.

* * * * *